Patented Sept. 26, 1939

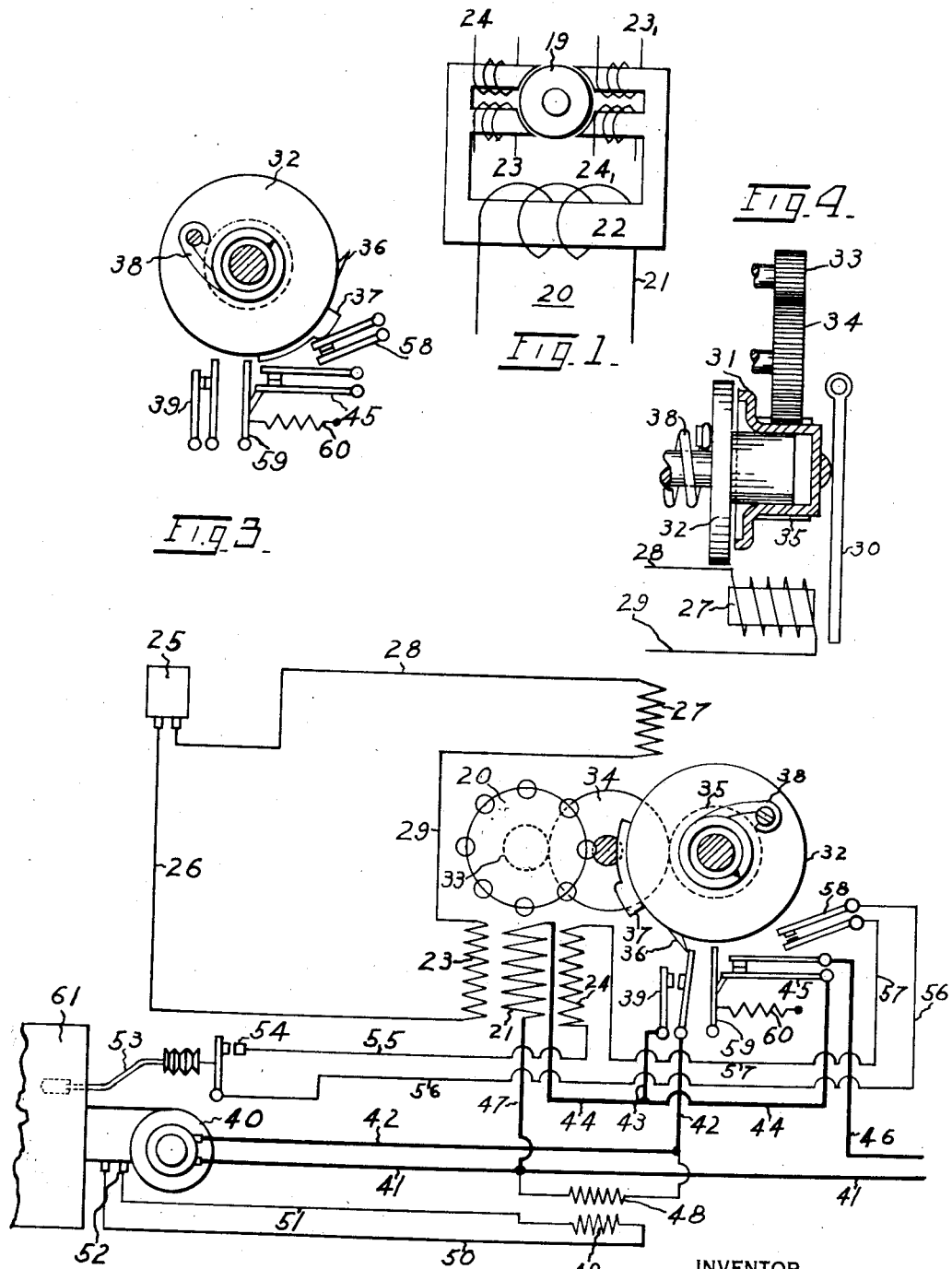

2,174,275

UNITED STATES PATENT OFFICE 2,174,275

CONTROL APPARATUS

Estel C. Raney, Columbus, Ohio, assignor to Ranco Incorporated, a corporation of Ohio Application May 18, 1936, Serial No. 80,293

13 Claims. (Cl. 158—28)

My present invention relates to an electrical system and more particularly to a system for controlling burners such as fuel burners.

In the control of a system for the consumption of a fuel, it is particularly important to provide adequate means for the ignition of the fuel and also means to prove or check the ignition of said fuel. For example, in an oil burner, much fuel can be expelled by the jet in a very short period of time. If this fuel is not immediately ignited, the flow of the fuel must be completely stopped. It is not only wasteful, but exceedingly dangerous to have a combustible mixture of this character within the combustion chamber. In the event of delayed ignition, that is, after several minutes have elapsed, it is possible to have a serious explosion.

One of the objects is to provide a shaded pole motor as a controlling means for the system; this motor is to be actuated by the thermostatic control, to start and stop the operation of the system through various switches.

A further object is to provide a commutating means or timing device, cooperating with the motor, through a magnetic clutch, to operate the switches, and mechanical means associated with the commutator for returning it to its original starting position, when disengaged by the clutch.

Further objects and advantages will be apparent from the following detailed description contained herein:

Fig. 1 is a diagrammatic view of the shaded pole motor;

Fig. 2 shows the wiring diagram of the system, with a schematic view of the commutator in the starting position;

Fig. 3 shows the commutator in the running position; and,

Fig. 4 shows the clutch mechanism and related reducing gears.

A shaded pole motor is shown at 20, in which the windings are shown in detail. An armature 19, of the squirrel cage type, is included, together with a primary or main stator winding 21 wound about the laminated field or core 22; additional, or auxiliary field windings are provided for starting and stopping the motor; these are also wound about the core 22. A winding 23, to be termed the starting winding, comprises two coils 23 and 23₁ that are connected in series. The magnetic fields of these coils are 180° apart and out of phase with the magnetic field set up by the main stator winding 21. An additional winding 24, to be termed the stopping winding, comprises the series connected coils 24 and 24₁. These are also 180° apart and spaced in a plane rotated 90° from the plane of the winding 23. It is to be understood that either set of windings may be utilized as the starting winding, which would merely cause rotation in the opposite direction. As in any squirrel cage induction motor, the rotor or armature will not start to rotate when the main field is energized; it always requires an additional starting winding, or split phase, to throw the magnetic field out of phase. For this reason, when the circuit of the winding 23 is closed by completing the circuit through the coils 23 and 23₁, it establishes a magnetic field that is out of phase with the magnetic field of the main winding 21 and starts the motor 20 to rotate in a clockwise direction. The motor will continue to rotate until the circuit of the winding 24 is closed, at which instant the magnetic field produced by the winding 23 is neutralized, in effect, by the magnetic field produced by the winding 24. In other words, the two sets of stator windings establish magnetic fields in opposite directions and since the strength of these fields are equal, the motor is stopped. These two windings 23 and 24, therefore, act as an electrical brake on the armature of the motor. It is evident that the windings 23 and 24 must be of equal inductance, etc., to produce like electrical fields in opposite directions. The principle of this type of shaded pole motor 20 may be advantageously utilized to operate a fuel control system as developed in the following description.

Referring to Fig. 2, the shaded pole motor is shown at 20, with its three field windings 21, 23 and 24. The primary field winding 21 is in constant connection with the power line through wire 47 connected to one side of the power line 41 and through wire 44 to switch 45 which is connected to the other side of the power line 46. The winding 23, being on the same core as winding 21, is inductively coupled to the winding 21 and acts, when its circuit is complete, as a step down transformer, yielding current at a reduced voltage that is utilized in the control.

A control device, in this case a thermostat 25, is positioned, remote from the motor 20, to be actuated by changes in room temperature. The starting winding 23 is in series with the room thermostat 25 and a solenoid 27 through the connecting wiring 26, 28, and 29. When the thermostat 25 calls for heat, due to a drop in room temperature, it closes this series circuit, thus causing energization of the starting winding 23. This throws the magnetic fields of windings 21 and 23 out of phase, which starts the motor 20 to rotate. The closing of the thermostat circuit also energizes the low voltage solenoid 27, which reacts to draw a bar 30 inwardly to engage a gear driven, friction clutch 31 with a movable commutator 32 or timing device, as it may be termed. The clutch 31 is driven by the motor 20, through a gear 33, attached to the motor shaft and the associated speed reducing gearing indicated at 34 and 35, said last gear 35 being on the clutch 31.

The clutch device, as described, is merely illustrative of one method that may be used to engage the commutator 32 and rotate it at a related speed to the motor 20. The commutator 32 is a rotatable disc having cams 36 and 37, preferably of insulating material, suitably disposed on its periphery. These cams act to open and close associated switches at given time intervals to be described in detail later. A spring 38 is used as a retracting means for the commutator, that is, if the clutch 31 is released from the commutator 32 after the commutator has been rotated, the spring 38 will bring the commutator 32 back to its original, or starting position, as shown in Fig. 2.

It should be noted that the construction limits the rotation of this commutator or disc to less than 360°, or a full turn, due to the retracting spring and the action of the associated switches.

In Fig. 2, the commutator 32 is shown in its starting position. Assume that the thermostat 25 closes the circuit, through the field winding 23 and the solenoid 27, the motor 20 will start and the solenoid 27 will be energized to draw the bar 30 inwardly. This will engage the rotating friction clutch 31 with the commutator 32, which last will move the cam 36 slowly, in a clockwise direction, to cause closing of a switch 39 that is normally biased to the closed position and held open by the cam 36 in the starting position. The closing of the switch 39 will energize a blower motor and pump mechanism 40 through the wiring 41, 42, switch 39 and wire 43, which in turn is connected to wire 44 through the switch 45 to the other side of the power line 46. The blower and pump 40 supply fuel to the burner. Simultaneously with the starting of the blower 40, the primary 46 of an ignition transformer is energized through the wiring 42 and 47, which connects the coil 48 to the source of power. Energizing the primary 48 induces a high frequency current in the secondary 49, of the transformer, which causes high frequency currents to traverse the wires 50 and 51 to a spark plug 52 or other means for ignition. This spark ignition, ignites the atomized spray of fuel at the burner. During this practically instantaneous operation, the commutator 32 continues to rotate slowly in a clockwise direction. In the meantime, the heat from the burner is acting upon a control 53, which is a thermally operated device, sensitive to temperature changes within the combustion chamber 61. As heat is generated in the chamber 61, the switch 54 associated with the control 53 closes, due to the action of the thermally sensitive control mechanism and an electrical connection is established through the stopping winding 24 by connected wiring 55, 56 and 57 up to the switch 58. The switch 58 remains open until it is engaged by the cam 37 on the commutator 32, to complete the circuit. Fig. 3 shows this last position of the commutator 32, cam 37 and switch 58. The switch 58 may be eliminated, but in the preferred form, this switch assures a definite time delay on the stopping of the commutator and also provides an immediate break in the circuit of winding 24 as the commutator 32 is revolved by the spring 38. As soon as the circuit through winding 24 is completed, due to the closing of switch 58, the motor 20 stops, as was previously explained, due to the neutralization of the secondary field windings 23 and 24.

In this stopped position, the solenoid 27 is still energized and continues to engage the clutch and commutator. Therefore, the commutator is held in the position shown in Fig. 3, which is in the normal operating position.

When the room temperature is sufficiently high, the thermostat 25 acts to break the solenoid circuit, which releases the clutch 31 and allows the spring return 38 to rotate the commutator 32 quickly back to its original position shown in Fig. 2. In this last position, the switch 39 is again opened, breaking the circuit to the blower 40 and the ignition coil 48. This shuts off the burner which allows the control 53 to open its associated switch 54. In other words, the entire system is deenergized, with the exception of winding 21, and is again ready to start the "heating up" cycle.

The control 53 is provided as a safety measure. If the fuel being sprayed by the blower 40 does not ignite, the control 53 will receive no heat and consequently will not close the switch 54. This will allow the motor to continue to rotate, since the stopping winding 24 is not energized when switch 58 is closed by stop 37. Cam 37, therefore, will continue to rotate until it engages switch 45, actuated through lever 59, which is held in place by a spring 60. As the lever 59 is tripped, the switch 45 opens, breaking the main circuit through the primary field coil 21. This, of course, de-energizes the winding 23 and the series connected solenoid 27 which allows the spring return 38 to bring the commutator back to the original starting position and stops the operation of the entire system. When this emergency condition arises, the system remains entirely inoperative by automatic means until the lever 59 is manually reset. The same action occurs when a fuel shortage occurs during a heating cycle.

The fuel control system as described has certain marked advantages from an operation standpoint. The mechanism is simple. It provides full automatic control for every phase of the cycle of operation as well as providing safety control to dominate any emergency condition.

The system as explained need not be limited for use on fluid fuels alone. It is evident that it could be easily adapted to a coal-fired stoker system. In this event, the ignition device might be eliminated and a safety control, similar to 53, could be placed in the bonnet of the furnace to shut off the system if the fire was extinguished, thus preventing further feeding of coal or coke, or in the event of fuel shortage.

While the form of embodiment of the present invention as herein disclosed constitutes a preferred form, it is to be understood that other forms might be adopted, all coming within the scope of the claims which follow.

I claim:

1. In a fuel control system, in combination with a device to be controlled; of a controller therefor, including a motor, said motor including a plurality of fields; switching mechanism controlled by the motor, one of said fields being adapted to cause rotation of the motor when energized and a second of said fields being adapted to neutralize the first; means responsive to demand for operation of the device for completing the circuit of the first mentioned field; means responsive to operation of the device and subsequent operation of the motor for completing the circuit of the second mentioned field; and means for returning the switching mechanism to its original position when the circuit is broken by the demand means.

2. In a fuel control system, in combination with a device to be controlled; of a controller therefor, including a switching mechanism, a motor, including a plurality of field windings, for actuating the switching mechanism, one of said windings being normally energized, means for energizing a second winding for starting the motor, means for energizing a third winding to neutralize the effect of the second winding and thereby stop the motor, and mechanically actuated means for returning the switching mechanism to its initial position when the first mentioned winding is deenergized.

3. In a fuel control system, in combination with a device to be controlled; of a controller therefor, including a switching mechanism, a motor, including a plurality of field windings, for actuating the switching mechanism, means for energizing one of said windings to start the motor, means for energizing a second winding to neutralize the effect of the second winding and thereby stop the motor, and mechanically actuated means for returning the switching mechanism to its initial position when the said windings are deenergized.

4. In a fuel control system, in combination with a device to be controlled; of a controller therefor, including a switching mechanism, a motor, a magnetic means to engage said motor to said switching mechanism, said motor having a plurality of field windings, one of said windings being in series with the magnetic means, control means also in series with the magnetic means for starting the motor and energizing the magnetic means, control means in series with a second of said windings, said second winding being disposed to neutralize the effect of said first winding and thereby stop the motor and means to return the switching mechanism to its original position in the event the magnetic means is de-energized.

5. In a fuel control system, in combination with a device to be controlled; of a controller therefor, including a switching mechanism, a motor, a magnetic means to engage said motor to said switching mechanism, said motor having a plurality of field windings, one of said windings being in series with the magnetic means, control means also in series with the magnetic means for starting the motor and energizing the magnetic means, control means in series with a second of said windings, said second winding being disposed to neutralize the effect of said first winding and thereby stop the motor and means whereby the motor can be stopped and the switching mechanism returned to its original position in the event that the second control means does not close the circuit of the second field winding.

6. A control system for translating apparatus, the combination with mechanism to be controlled, a movable timing device, electrical actuating means for starting movement of the timing device and for starting the mechanism, means operated by the movement of the timing device for rendering the mechanism inoperative and for causing reversal of movement of the timing device, for returning the same to its starting position, said last means being operative after a predetermined operation of the timing device, means responsive to normal operation of the mechanism for rendering inoperative the means for causing reversal and means for rendering the reversal means operative when the first means is rendered ineffective.

7. A control system for a fuel burning device comprising in combination, switching means operable for controlling the operation of said device; a timing mechanism operable to actuate the switching means; a control circuit, which when completed, causes the timing mechanism to be rendered operative; a second control circuit for rendering the timing mechanism inoperative when said second control circuit is energized; means responsive to the establishment of combustion, and in series with said second control circuit, for partially completing said second circuit; and means operated by the timing mechanism after a predetermined period of operation thereof for completing said second circuit, whereby said timing mechanism is rendered inoperative while said fuel burning device is maintained operative.

8. In a fuel control system, in combination with a device to be controlled; of a controller therefor, including a switching mechanism, a motor, magnetic means for engaging said motor to said switching mechanism, said motor having a plurality of field windings, one of said windings being in series with the magnetic means; control means also in series with the magnetic means for starting the motor and energizing the magnetic means; control means in series with a second of said windings, said second mentioned control means being rendered operative in response to combustion and by operaiton of the said motor a predetermined number of revolutions, said windings being disposed to neutralize the effect of said first winding when the said second mentioned control means is operated and thereby stop the motor.

9. In a fuel control system, in combination with a device to be controlled; a controller therefor, including a shaded pole motor, said motor having a winding which when energized causes the motor to stop; means for energizing the winding; a switch for rendering the said device operative; a second switch for energizing the said winding to cause the motor to stop; a third switch for deenergizing the device, and means actuated by the said motor for operating the switches at time intervals in the order named.

10. In a fuel control system, in combination with a device to be controlled; a controller therefor, including a shaded pole motor, said motor having a winding which when energized causes the motor to stop; means for energizing the winding; a switch for rendering the said device operative; a second switch for energizing the said winding to cause the motor to stop; a third switch for deenergizing the device, and timing means actuated by the said motor for operating the switches at time intervals in the order named, the time interval between the operation of the first mentioned switch and the said third switch being greater than the time interval between the operation of the said second switch and the third switch.

11. In a fuel control system, in combination with a device to be controlled, of a controller therefor, including a motor, said motor having a plurality of fields, one of said fields being adapted to cause rotation of the motor, when energized, for initiating operation of the device, and a second of said fields being adapted, when energized, to neutralize the said one field to stop the motor; means for energizing the said second winding including switching means in the field circuit, said switching means being adapted to close in response to a predetermined number of revolutions of the motor and in response to a combustion condition produced by operation of the device.

12. In a fuel control system, in combination with a device to be controlled; a controller therefor including a switch for energizing the device when the switch is closed, and a switch for deenergizing the device; means including a movable member for operating the said switches, one of said switches being operated when the member moves to a predetermined position and the other of said switches being operated when the movable member moves to a second predetermined position; and means for stopping the movable member at a third predetermined position in response to a condition produced by operation of the device and a predetermined movement of the movable member subsequent to energization of the device, said third position being intermediate the first and second mentioned positions.

13. In a fuel control system, in combination with a device to be controlled; means for energizing the device in response to a condition and for deenergizing the device after a predetermined time lapse following energization of the device; and means for preventing deenergization of the device, said last mentioned means being rendered operative in response to a condition produced by the operation of the device and a predetermined operation of the first mentioned means subsequent the starting of operation of the device.

ESTEL C. RANEY.